Patented Feb. 9, 1937

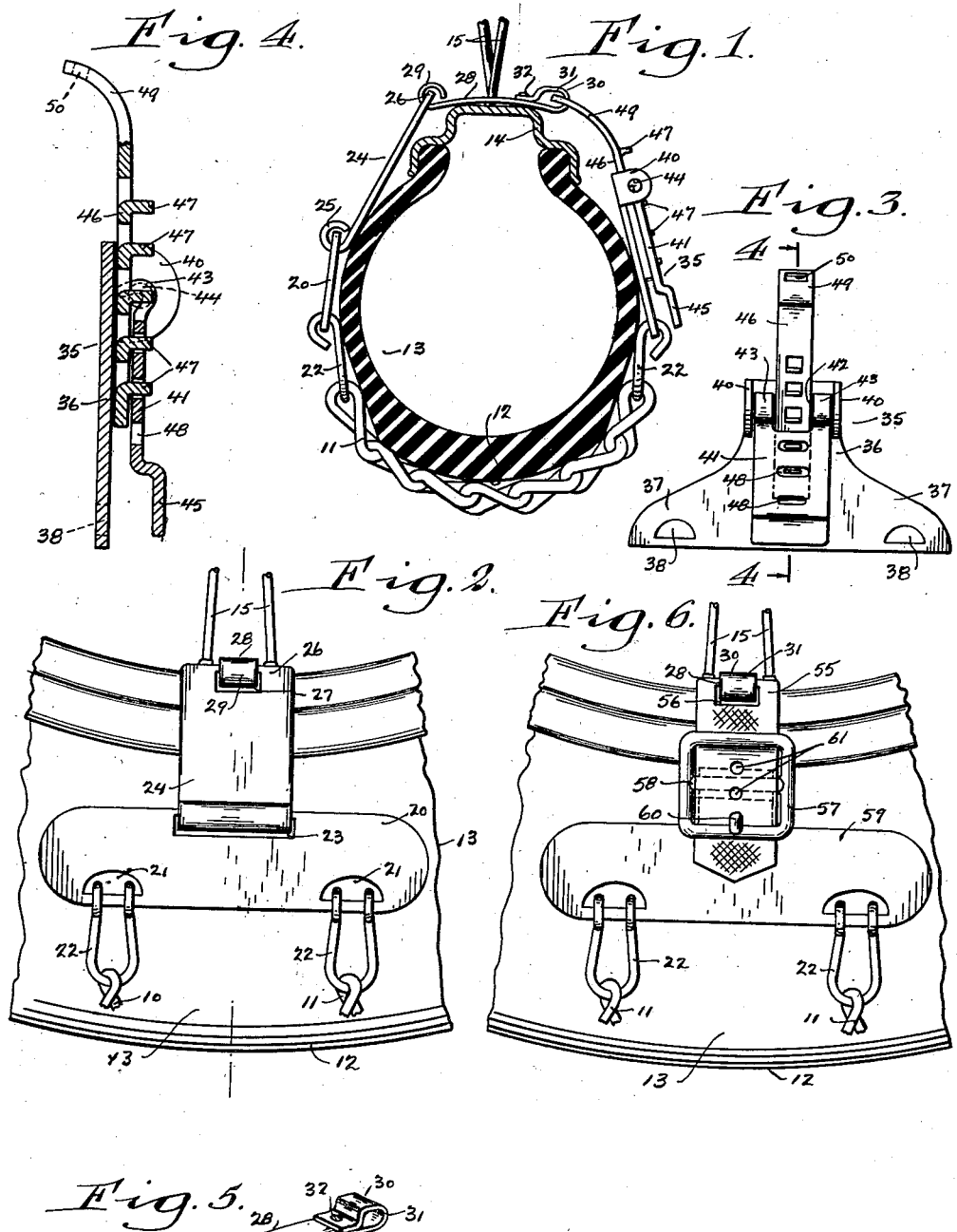
Feb. 9, 1937. F. E. STAHL 2,069,979
EMERGENCY ANTISKID DEVICE
Filed Dec. 21, 1934
Inventor,
FRANK E. STAHL
by
Attorney.

2,069,979

UNITED STATES PATENT OFFICE 2,069,979

EMERGENCY ANTISKID DEVICE

Frank E. Stahl, Tonawanda, N. Y., assignor to Columbus McKinnon Chain Corporation, Tonawanda, N. Y., a corporation of New York Application December 21, 1934, Serial No. 758,681

2 Claims. (Cl. 152—14)

My invention relates in general to anti-skid devices used in connection with automobiles and particularly to that type of device which may be clamped upon the tire and rim when being used.

It is well known to those skilled in the art that emergency anti-skid devices of the present day are held in place by means of flexible straps which are attached by suitable clamping or buckle means. Because such straps are of flexible material (usually fabric, or fabric and rubber) they must be of ample size in order to have sufficient strength. Therefore, on certain types of automobile wheels having wire spokes, such straps are too wide to go between the spokes.

It has been the principal object of my invention to provide a device of this nature having a strap member narrow enough to go between closely arranged spokes.

Furthermore, it has been an object to make the strap element of the device of metal so that it will have sufficient strength.

Moreover, it has been an object to provide suitable clamping means for this type of strap.

Furthermore, my device is inexpensive to manufacture and when once clamped in position will not become unfastened.

The above objects and advantages have been accomplished by the device shown in the accompanying drawing, of which:

Fig. 1 is a transverse, sectional elevation of my device as applied to an automobile tire and rim, and is taken on line 1—1 of Fig. 2.

Fig. 2 is a side elevation of the device in position upon an automobile tire.

Fig. 3 is a face view of the buckle or clamping means used in my device.

Fig. 4 is an enlarged, sectional view of such clamping means and is taken on line 4—4 of Fig. 3.

Fig. 5 is a perspective view of the strap-connecting link of the device.

Fig. 6 is a side view of a modified form of invention.

As shown in the drawing, my device is of the type preferably employing two cross chains 10 and 11 which are designed to engage the tread 12 of the tire 13. The tire is shown mounted upon a wheel rim 14 which is mounted upon the hub (not shown) of the wheel by means of closely pitched wire spokes 15.

One of the ends of each of the cross chains 10 and 11 is secured to a chain plate 20 which is provided with spaced, elongated apertures 21 for the reception of the attaching hooks 22 at the ends of the chains. At the opposite side of the chain plate is formed a centrally-arranged, elongated slot 23. Pivotally attached to the plate 20 and engaging with the slot 23 thereof is the plate link 24 of the device. This link is relatively wide, extending preferably across two adjacent spokes, and it is connected to the plate by means of its end 25 which is curved so as to provide pivotal connection with the plate. The plate link is of such a length that, when the chains are in position upon the tire, its upper end 26 will come at a point about opposite the inner periphery of the rim 14. This upper end of the plate link is provided with a centrally-arranged slot 27 with which the spoke link 28 engages. This link is pivotally attached to the plate link by means of its curved end 29. The spoke link is disposed between any two adjacent links and extends across the inner periphery of the rim 14. The opposite end 30 of the spoke link is provided with a return bend 31 which is interspaced with the body part of the link and which has its ends brought down and secured to the body part by means of a rivet 32.

Connecting the end 30 of the spoke link 28 with the ends of the cross chains 11, which are opposite to those secured to the chain plate 20, is the buckle or clamping means 35 of my device. This buckle comprises a body part 36 having oppositely arranged side wings 37, each formed with an elongated aperture 38 for the reception of the hooks 22 at the ends of the cross chains 11. The pitch of the elongated apertures 38 is obviously the same as the elongated apertures 21 of the chain plate 20, whereby the chains 11 will lie in planes which are substantially parallel. The body part 36 is provided, at the side opposite to the wings 37, with upstanding bearing lugs 40 which are formed with suitable apertures for pivotally holding the clamp 41 of the device. The clamp is made from relatively heavy sheet metal and has its pivoted end bifurcated by the provision of a centrally arranged slot 42, thus forming two cam arms 43. The metal in the cam arms is turned down, and each is so arranged that its inner surface forms an angle with the bottom surface of the clamp which is less than a right angle. Each of the arms 43 is formed with a trunnion 44 which engages with the apertures formed in the bearing lugs 40. The extreme end surfaces of the cam arms 43 and the trunnions 44 formed on these ends are so arranged that when the clamp is in its clamping position, as shown in Figs. 3 and 4, the ends of the arms will come into positive frictional contact with the body 36 of the clamp, and when in locking position they will be slightly in advance of a center line drawn through the trunnions 44 and perpendicular to the face of the body, or on that side of the trunnion which is opposite to the body part of the clamping member. The clamp 41 has a substantially flat body part, at the free end of which is provided an offset portion 45 which forms a convenient grip for the fingers when it is to be operated. The body part of the clamp is so arranged that it is in interspaced relation with the upper face of the body part 36 and within this space is disposed the tongue 46 of my clamping means or buckle. This tongue is relatively narrow and is designed to pass between the centrally arranged slot 42 forming the pivot arms 43 of the clamp, and to have a portion of its body part lying beneath the clamp 41 and between it and the body part 36. This tongue is provided with a number of upstanding lock lugs 47 which are preferably punched from the material of the tongue, some of which are engageable with apertures 48 formed in the body of the clamp. As shown, three apertures 48, of obviously the same pitch as the lugs 47, are provided in the clamp, and one, two, or three of such lugs can be engaged by the clamp. As shown in the drawing, there are five lugs 47, and should the adjustment of the chain bring the tongue down into the clamp so that one or more of its lugs 47 will be below the last opening 48 in the clamp, the lugs 47 will be extended down below the clamp and the offset end 45 will provide sufficient space for the accommodation of the lugs which are not in engagement with the apertures of the clamp. The upper end 49 of the tongue is curved inwardly, somewhat toward the rim of the tire, and it is provided with a suitable slot 50 for engagement with the return bend 31 of the end 30 of the spoke link 28. The width of the tongue 46 is not much greater than the width of the spoke link 28 so that it may be freely passed between the spokes 15 of the wheel.

In Fig. 6, I have shown a device having a different type of fastening means. As here shown, a flexible strap 55 is connected to the return bend 31 of the end 30 of the spoke link 28 by means of a slot 56 formed in the upper end thereof. Since this strap is flexible, it can be easily passed between the spokes 15 of the wheel. In this form a buckle 57 is used which has its central bar 58 pivotally attached to the chain plate 59 in any suitable manner. The buckle is also provided with the usual tongue 60 which engages with suitable apertures 61 formed in the strap.

Obviously, when the device of the form of Figs. 1 to 5 is to be used, the tongue 46, having been detached from the clamp 41, is passed through between any two adjacent spokes and is engaged with the body part 36 of the clamping device, the clamp 41 thereof having been moved to a position perpendicular to the body 36 of the clamping means. The tongue is drawn over the body of the clamping device to a point where the cross chains 10 and 11 will be properly fitted to the tire, whereupon the clamping member 41 will be moved down to its normal locking position and the tongue will be readjusted so as to bring one, two, or three of its lugs 47 into engagement with as many apertures 48 of the clamp as such adjustment calls for. When the clamp has been pressed down to its normal clamping position, the downwardly extending ends of the bearing arms 43 will frictionally engage with the top surface of the body 36; and, as above indicated, such surfaces will be moved beyond the perpendicular center line which is opposite to the body part of the clamp. When in such position, it will be obvious that the clamp will be kept in engagement by such cam action of its ends on the body of the clamping device, and, furthermore, that the pull of the tongue will tend to retain the clamp in such position. When the tongue has been engaged with the clamp in proper position, the spoke link 28 will be disposed between the two adjacent spokes and will occupy a position preferably against the inner periphery of the rim, as shown in Figs. 1 and 2.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. The combination with an automobile wheel and a tire carried thereon, of an emergency antiskid device, comprising a plurality of cross chains, a chain plate carrying the cross chains at one of their ends, a relatively wide plate link pivotally connected at one end to the chain plate, a narrow, metallic spoke link pivotally connected to the opposite end of the plate link and disposed between two adjacent spokes, and fastening means connecting the other ends of the cross chains with the spoke link, whereby the chain is adapted for use on wheels having closely pitched spokes.

2. The combination with an automobile wheel and a tire carried thereon, of an emergency antiskid device, comprising a plurality of cross chains, a chain plate carrying the cross chains at one of their ends, a relatively wide plate link pivotally connected at one end to the chain plate, a narrow, metallic spoke link disposed between two adjacent spokes, such spoke link being formed with a loop at each end thereof, and fastening means pivotally connected to the opposite ends of the cross chains, said spoke link having one of its looped ends pivotally connected to the plate link and its other looped end pivotally connected to the fastening means.

FRANK E. STAHL.